(12) United States Patent
Keller

(10) Patent No.: US 12,546,372 B2
(45) Date of Patent: Feb. 10, 2026

(54) CALIPER MOUNT BRACKETS WITH REPLACEABLE HARDENED WEAR PLATES

(71) Applicant: Brian E. Keller, Freeland, MD (US)

(72) Inventor: Brian E. Keller, Freeland, MD (US)

( * ) Notice: Subject to any disclaimer, the term of this patent is extended or adjusted under 35 U.S.C. 154(b) by 493 days.

(21) Appl. No.: 18/150,572

(22) Filed: Jan. 5, 2023

(65) Prior Publication Data

US 2023/0220892 A1 Jul. 13, 2023

Related U.S. Application Data

(60) Provisional application No. 63/297,543, filed on Jan. 7, 2022.

(51) Int. Cl.
  *F16D 65/095* (2006.01)
  *F16D 55/22* (2006.01)
  *F16D 65/00* (2006.01)

(52) U.S. Cl.
  CPC ............ *F16D 65/095* (2013.01); *F16D 55/22* (2013.01); *F16D 65/0043* (2013.01); *F16D 2250/0084* (2013.01)

(58) Field of Classification Search
  CPC .... F16D 65/095; F16D 65/0043; F16D 55/22; F16D 55/227; F16D 55/228; F16D 2250/0084
  See application file for complete search history.

(56) References Cited

U.S. PATENT DOCUMENTS

| 4,219,106 | A | * | 8/1980 | Lupertz | F16D 65/095 |
| | | | | | 188/73.32 |
| 5,577,577 | A | * | 11/1996 | Hirai | F16D 65/095 |
| | | | | | 188/73.38 |
| 6,302,243 | B1 | | 10/2001 | Ruiz | |
| 8,161,614 | B2 | | 4/2012 | Plantan et al. | |
| 8,776,959 | B2 | * | 7/2014 | Kaneko | F16D 65/0977 |
| | | | | | 188/73.31 |
| 2004/0016610 | A1 | * | 1/2004 | Morris | F16D 65/095 |
| | | | | | 188/73.31 |
| 2005/0236236 | A1 | * | 10/2005 | Farooq | F16D 65/0974 |
| | | | | | 188/73.31 |
| 2007/0227839 | A1 | * | 10/2007 | Barrett | F16D 65/0977 |
| | | | | | 188/73.31 |
| 2010/0051393 | A1 | * | 3/2010 | Arioka | F16D 65/0972 |
| | | | | | 188/72.3 |

(Continued)

*Primary Examiner* — David R Morris
(74) *Attorney, Agent, or Firm* — LaMorte & Associates, PC

(57) ABSTRACT

An improved brake assembly having brake pads that are biased against a rotor using a caliper. Caliper mount brackets bolt to the caliper and hold the brake pads in position. The caliper mount brackets receive and retain replaceable contact plate inserts. The contact plate inserts contact and support the brake pads within the brake assembly. The contact plate inserts each have a first plate and a second plate that extends from the first plate at a perpendicular. The caliper mount brackets receive and retain the contact plate inserts in positions where each first plate and each second plate are positioned to support the brake pads when installed within the caliper mount assembly. The contact plate inserts are harder than the back plates of the brake pads. Accordingly, the contact plate inserts are not rapidly worn by the brake pads and can last much longer than do the brake pads.

9 Claims, 5 Drawing Sheets

(56) References Cited

U.S. PATENT DOCUMENTS

| | | | |
|---|---|---|---|
| 2013/0025981 A1* | 1/2013 | Maehara | F16D 65/0978 |
| | | | 188/73.31 |
| 2014/0048360 A1* | 2/2014 | Plantan | F16D 65/183 |
| | | | 188/73.31 |
| 2017/0198772 A1 | 7/2017 | Rocca-Serra | |
| 2021/0276524 A1 | 9/2021 | Crippa et al. | |

* cited by examiner

CALIPER MOUNT BRACKETS WITH REPLACEABLE HARDENED WEAR PLATES

RELATED APPLICATIONS

The present application claims benefit of U.S. Provisional Patent Application No. 63/297,543, filed Jan. 7, 2022.

BACKGROUND OF THE INVENTION

1. Field of the Invention

In general, the present invention relates to the structure of pneumatically powered vehicle brake assemblies. More particularly, the present invention relates to the structure of caliper mount brackets and the interface between caliper mount brackets and the brake pads they support.

2. Prior Art Description

In the United States of America, the Department of Transportation categorizes trucks and other commercial vehicles into various classifications. The classifications primarily depend upon the Gross Vehicle Weight Rating or the GVWR of the vehicle. The classification determines what type of licenses are needed to operate the vehicle and what type of equipment, such as brakes, that the vehicle must contain. For example, class 6 trucks have GVWRs between 19,501 pounds and 26,000 pounds and have a single rear axle. Class 7 trucks have GVWRs between 26,001 pounds and 33,000 pounds and usually have three axles or more. Class 8 trucks have a GVWR of over 33,001 pounds and includes most tractor trailers.

In North America, trucks in Class 6, Class 7 and Class 8 are required to have air brake systems. Such air brake systems traditionally consisted of brake shoes that are moved against brake drums using pneumatic pressure. The engine of the truck powers an air compressor. The air compressor pressurizes an air tank reservoir. Air from the air tank reservoir is directed to the brakes by the actions of the driver of the vehicle.

Many traditional pneumatic brake systems use brake drums. During braking, air is directed into an air brake chamber near each wheel. The air is utilized to move a rod connected to a lever, therein creating torque. The lever moves forward, turning a splined shaft that separates the brake shoes. This moves the brake shoes against a circular drum to stop the truck. Both the capacity of the air brake chamber and the size of the lever can be varied to create different levels of torque. Different torque range correspond to specific grades of brake pads. This enables a traditional air brake systems to be customized for trucks of different types and weight classes. Air brake systems that utilize brake drums are typically designed to stop a truck that is traveling 60 MPH within 325 feet. However, the Department of Transportation is currently working to reduce the stopping distance requirements to 250 feet. Accordingly, traditional air brake systems are being rendered obsolete.

Due to the change in required stopping distance, the trucking industry is migrating toward air disc brake systems. These systems work via the same air brake power. However, the brake shoe, drum and lever system, are replaced by brake pads and an air actuated caliper. The caliper contains tappets, in the form of hardened heat resistant plates, that push brake pads against a rotor. The rotor is attached to the wheel. When braking is needed, the driver depresses the brake pedal and air forces the tappets against the brake pads. The brake pads press against the rotor, thus forcing the wheel to slow or stop.

Due to the increased weight capacity of modern trucks and the need for reduced stopping distances per weight class, the brake pads and rotors experience large forces and substantial frictional heat during braking. Normal heat ranges generated by standard braking vary from 375 degrees to 575 degrees Fahrenheit. Most of the air disc brake components are made of cast iron and can maintain their functionality within this temperature range. However, brake friction material does degrade with age, environmental exposure, and/or severe braking. Such wear can raise the temperature of various components to over 700 degrees Fahrenheit. Although cast iron components can operate in this heat range, the high heat accelerates wear. Hot cast iron is softer than cold cast iron. Further, hot cast iron oxidizes faster than cold cast iron. Additionally, physical wear is caused by contact with the hard steel back plates of the brake pads. Each time the brakes are applied, the back plate on the brake pad contacts the cast iron caliper mount brackets with significant force. As the brake pads contact the spinning rotors, the contact forces whip the steel backing plates of the brake pads against the caliper mount brackets. Under severe braking circumstances, or just due to repeated braking over extended periods of time, the caliper mount brackets will wear to a point where they have to be replaced. The bracket replacement procedure is typically scheduled every time, or every other time, the disc pads are replaced. This depends upon the weight of the truck and its braking frequency.

Replacing caliper mount brackets is both time consuming and expensive. This is especially true for fleets of commercial trucks where there are a number of trucks containing multiple caliper mount brackets.

A need therefore exists for a system and method that can be used to reinforce caliper mount brackets, therein reducing wear and greatly extending the operational life of the component. A need also exists for a system and method that makes the replacement of worn caliper mount brackets less expensive and less time consuming. These needs are met by the present invention as described and claimed below.

SUMMARY OF THE INVENTION

The present invention is an improved brake assembly and the components that create the improvement within the brake assembly. The overall brake assembly has brake pads that are biased against a rotor using a caliper. Caliper mount brackets bolt to the caliper and hold the brake pads in the proper position. The caliper mount brackets are modified to receive and retain replaceable contact plate inserts. The contact plate inserts contact and support the brake pads within the brake assembly. The contact plate inserts are separate and distinct from the caliper mount brackets and can be selectively removed from the caliper mount brackets and replaced when needed.

The contact plate inserts each have a first plate and a second plate that extends from the first plate at a perpendicular. The caliper mount brackets receive and retain the contact plate inserts in positions where each first plate and each second plate are positioned to support the brake pads when installed within the caliper mount assembly. The contact plate inserts are harder than the back plates of the brake pads. Accordingly, the contact plate inserts are not rapidly worn by the brake pads and can last much longer than do the brake pads.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system and method can be embodied in many ways, only one exemplary embodiment is illustrated. The exemplary embodiment is being shown for the purposes of explanation and description. The exemplary embodiment is selected in order to set forth one of the best modes contemplated for the invention. The illustrated embodiment, however, is merely exemplary and should not be considered a limitation when interpreting the scope of the appended claims.

Figure 1:
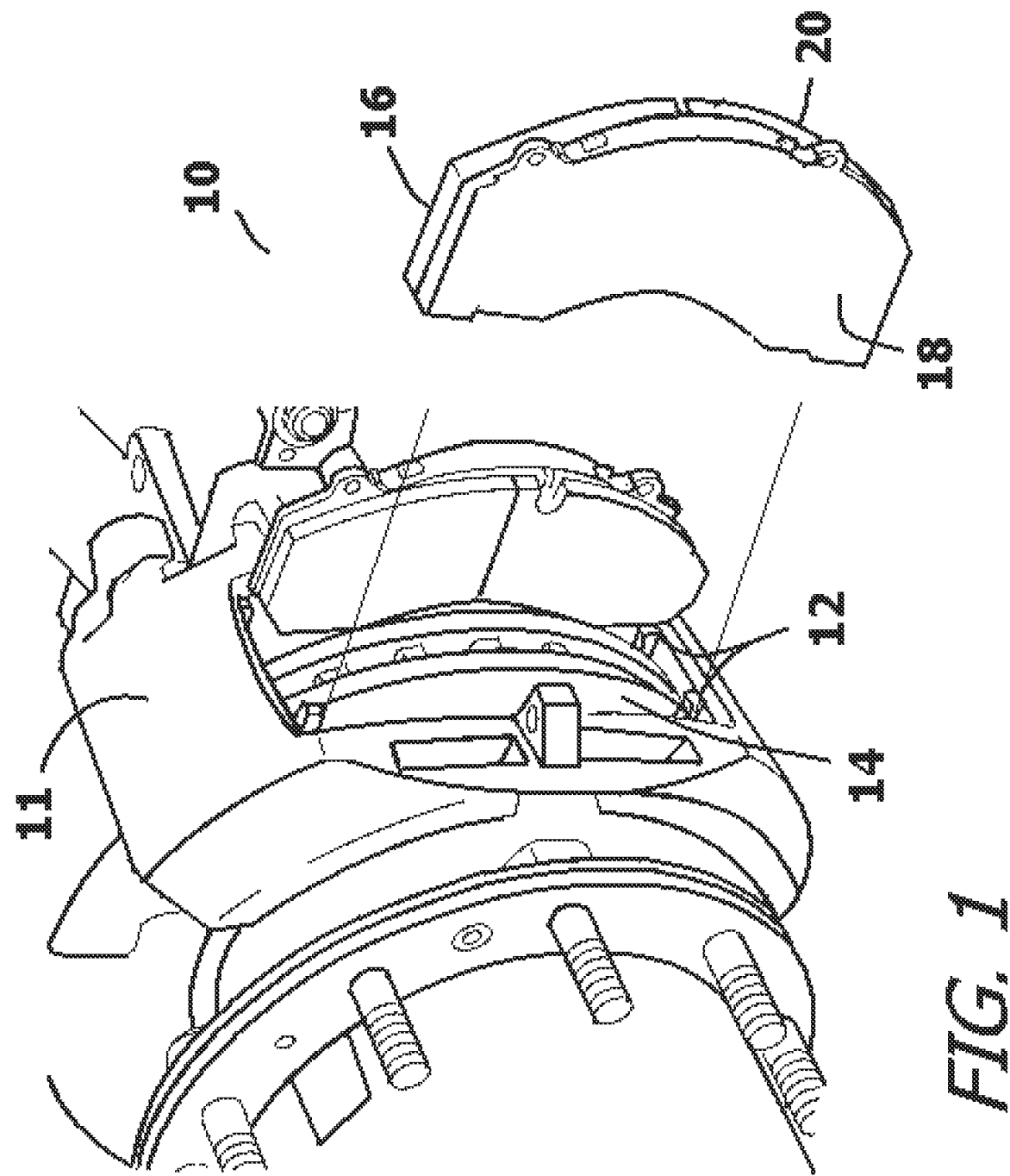
FIG. 1 shows a prior art brake assembly containing a caliper, caliper mounting brackets, and brake pads.

Referring to FIG. 1, a prior art air disc brake system 10 is shown. The air disc brake system 10 has a caliper assembly 11 with caliper mount brackets 12 that are positioned adjacent to a brake rotor 14. The traditional caliper mount brackets 12 retain brake pads 16. The brake pads 16 have metal back plates and friction material 20. The traditional caliper mount brackets 12 have integrated retention features that are cast into the structure of the brackets 12. The retention features receive and retain the ends of the metal back plates 18, therein holding the brake pads 16 in place. However, the fit is not precise and gaps up to 1/32 of an inch commonly exist. Accordingly, the metal back plates 18 repeatedly strike against the integrated retention features as the brake pads 16 repeatedly engage the rotor 14. The repeated striking causes rapid wear of the integrated retention features within the traditional caliper mount brackets 12. The result is that the traditional caliper mount brackets 12 must be replaced often. This requires the air disc brake system 10 be disassembled and the traditional caliper mount brackets 12 unbolted.

Figure 2:
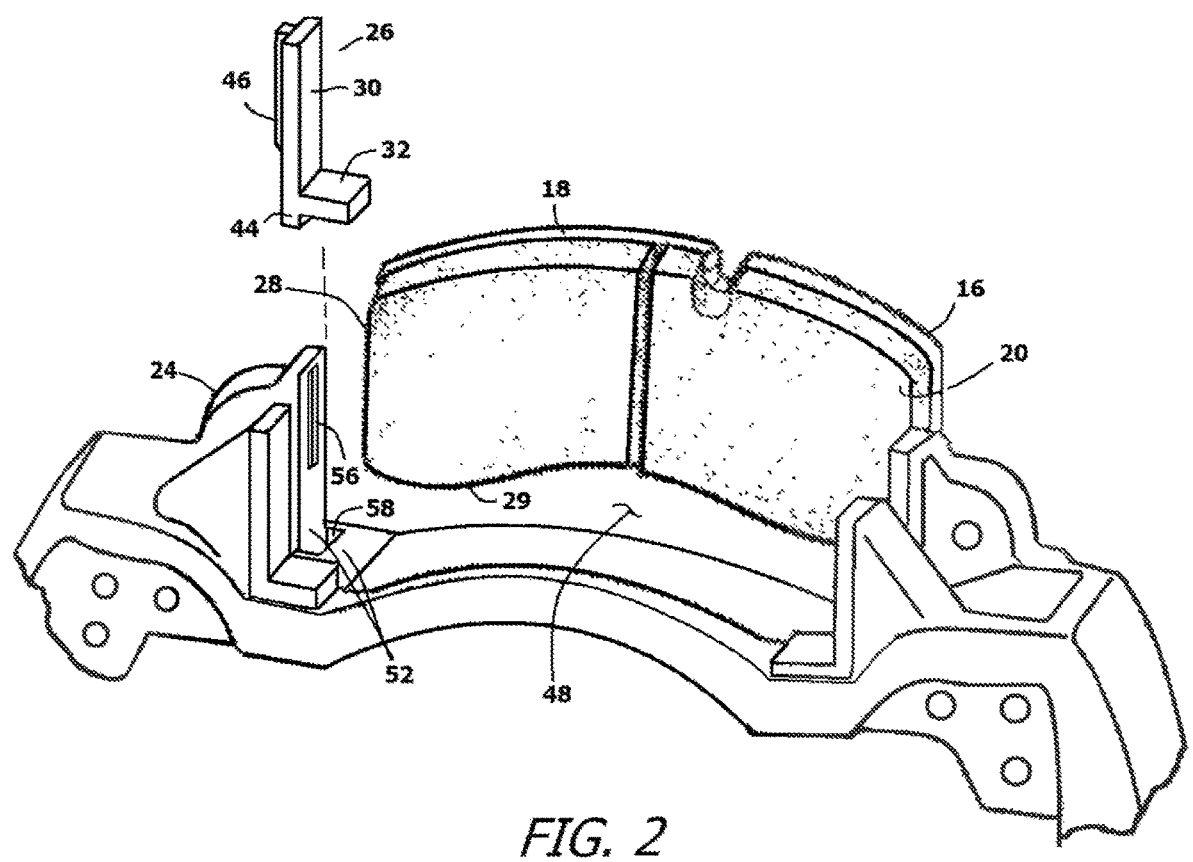
FIG. 2 shows an exemplary embodiment of a caliper mount bracket with replaceable contact plate inserts, shown in conjunction with a traditional brake pad.

Referring to FIG. 2, a modified caliper mount bracket 24 is shown. The modified caliper mounting bracket 24 can be a new component or can be a prior art caliper mount bracket that is machined to the design described. The modified caliper mount bracket 24 is bolted to a caliper assembly 11 (FIG. 1) of a vehicle in a traditional manner. The modified caliper mount bracket 24 is shown in conjunction with replaceable contact plate inserts 26 and a brake pad 16. The modified caliper mount bracket 24 is designed and/or machined to support and retain the replaceable contact plate inserts 26. The replaceable contact plate inserts 26, in turn, contact and support the brake pad 16. It will be understood that on a vehicle, two brake pads are used at each modified caliper mount bracket 24. In the current illustration, only one brake pad 16 is shown to better show components and to simplify description.

As will be explained in more detail, the replaceable contact plate inserts 26 act as an interface between the brake pad 16 and the modified caliper mount bracket 24. Each brake pad 16 has friction material 20 that is affixed to a metal back plate 18. The metal back plate 18 has side edges 28 and a bottom edge 29. It is the side edges 28 and the bottom edge 29 of the metal back plate 18 that physically contact the replaceable contact plate inserts Referring to FIG. 3 in conjunction with FIG. 2, it can be seen that each replaceable contact plate insert 26 is generally L-shaped. The replaceable contact plate insert 26 contains both a vertical first plate 30 and a lateral plate 32. The vertical first plate 30 has a midline 34 that runs lengthwise through the center of the vertical first plate 30. The vertical first plate 30 has a front surface 36 and a rear surface 38 that both extend between a common top edge 40 and a common bottom edge 42. Both the top edge 40 and the bottom edge 42 are bisected by the midline 34. The lateral plate 32 extends at a perpendicular from the front surface 36 of the vertical first plate 30 just above the bottom edge 42. Accordingly, a short section 44 of the vertical first plate 30 extends from the lateral plate 32 to the bottom edge 42. Both the vertical first plate 30 and the lateral plate 32 are made from highly wear resistant metal, such as hardened steel, stainless steel, tungsten alloys, and titanium alloys that have a hardness on the Rockwell scale greater than that of the metal back plate 18 of the brake pad 16.

A guide key 46 is formed on the rear surface 38 of the lateral plate 32. The guide key 46 extends in a plane that is perpendicular to the rear surface 38 of the vertical first plate 30. The midline 34 of the vertical first plate 30 is in the same plane as the guide key 46. The guide key 46 runs downwardly from the top edge 40 of the vertical first plate 30. The guide key 46 extends down along the midline 34 of the vertical first plate 30 but does not extend as far as the position of the short section 44.

Figure 3:
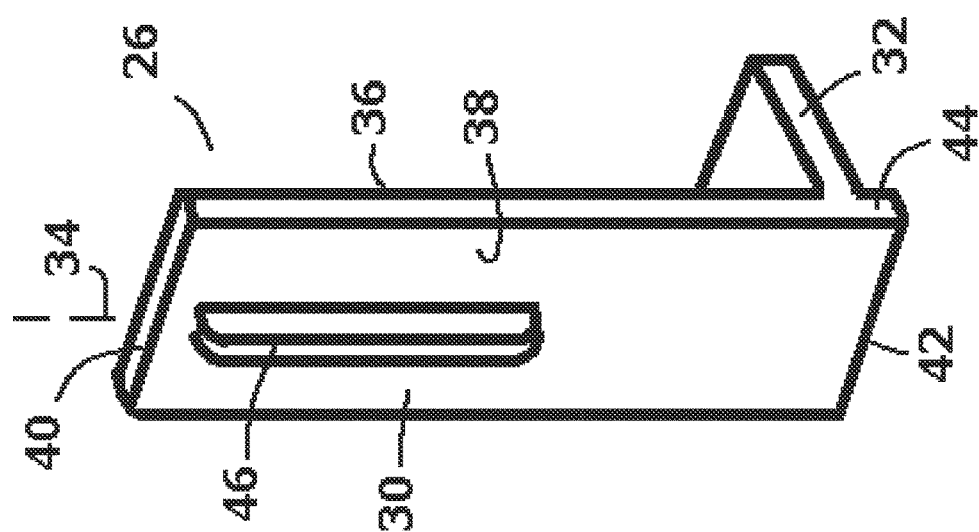
FIG. 3 shows a perspective view of the replaceable contact plate insert.
Figure 4:
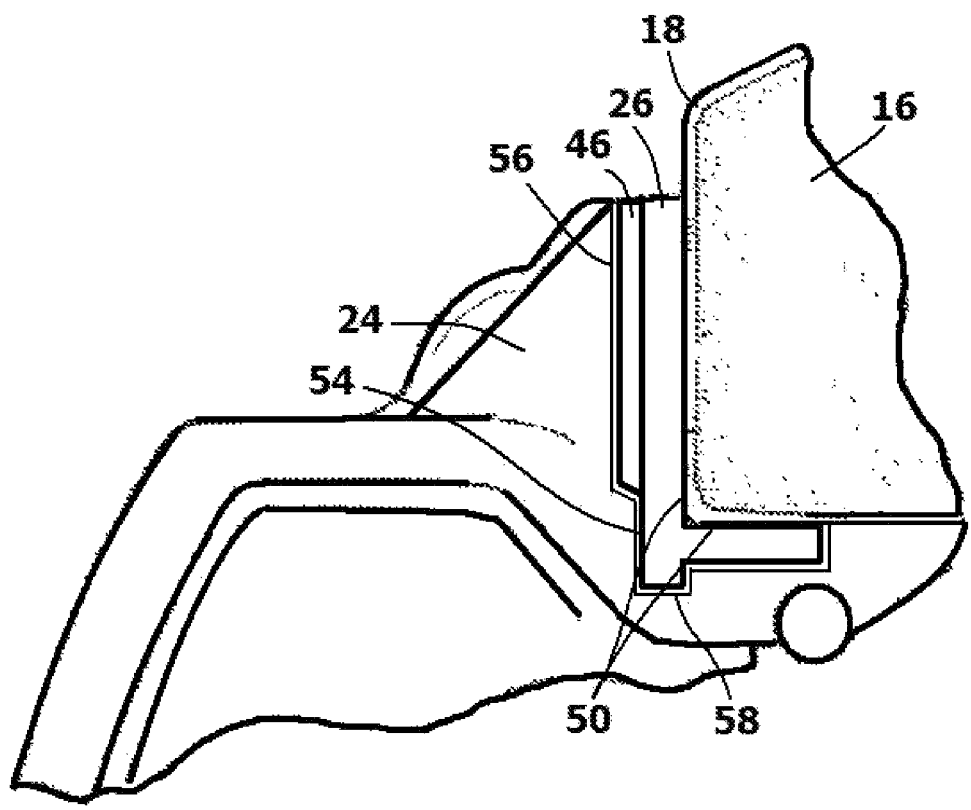
FIG. 4 shows a fragmented view of the contact plate insert installed into the caliper mount bracket.

Referring to FIG. 4 in conjunction with FIG. 3 and FIG. 2, it can be seen that the modified caliper mount bracket 24 defines open gap spaces 48 that are sized and shaped to receive the brake pads 16. Support mounts 50 are formed on opposite ends of each gap space 48. The support mounts 50 have machined surfaces 52 that face the open gap spaces 48 and are configured to receive and retain the replaceable contact plate inserts 26. The machined surfaces 52 on the support mounts 50 include a vertical surface 54 with a vertical groove 56. The vertical groove 56 is shaped and sized to receive the guide key 46 of a replaceable contact plate insert 26. Furthermore, each of the machined surfaces 52 also include a relief 58 that is sized to receive the short section 44 of a replaceable contact plate insert 26.

In use, the metal back plates 18 of the brake pads 16 rests against the replaceable contact plate inserts 26. The material of the replaceable contact plate inserts 26 is much more durable than that of the metal back plates 18. As a result, when the components wear against each other, the metal back plates 18 of the brake pads 16 wear much faster than does the replaceable contact plate inserts 26. The brake pads 16 are replaced during routine maintenance. The replaceable contact plate inserts 26 may never need to be replaced. If they do wear, the replaceable contact plate inserts 26 can be removed and replaced without having to remove or disassemble the modified caliper mount brackets 24. The replaceable contact plate inserts 26 are held in place by the contact forces of the brake pads 16 and the intermesh of the replaceable contact plate inserts 26 with the machined surfaces 52. Accordingly, no tools are needed to remove and replace the replaceable contact plate inserts 26 once the brake shoes 16 are removed. This greatly increases the ease and speed of maintenance since there are no mechanical fasteners that can corrode and bind in the highly corrosive environment of a wheel well.

The use of replaceable contact plate inserts 26 also produces more even wear of the brake pads 16 and rotors. This is due to the fact that the contact plate inserts 26 increases dimensional precision and keep the brake pads 16 parallel to the rotors. This reduces any formation of wear grooves in the surfaces that support or contact the brake pads 16. This improves braking consistency via uniformity and enables the modified caliper mount brackets 24 to last the entire life cycle of the braking system and/or vehicle. If the contact plate inserts 26 do require replacement, it would be at a much lower cost and with less associated labor.

Figure 5:
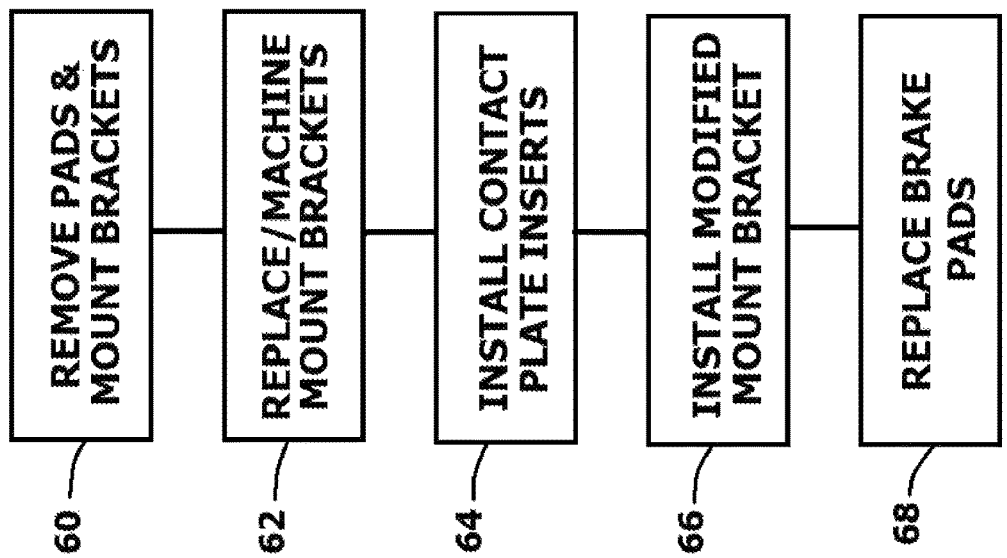
FIG. 5 shows a block diagram outlining a method of installation.

Referring to FIG. 5, in conjunction with all earlier figures, the methodology of utilizing the present invention will now be understood. For a retroactive application to a vehicle, the existing brake pads 16 and the traditional caliper mount brackets 12 are removed. See Block 60. The traditional caliper mount brackets 12 are either replaced or machined to obtain the new design of the modified caliper mount brackets 24. See Block 62. The modified caliper mount brackets 24 are then installed on the vehicle. See Block 64. Once the modified caliper mount brackets 24 are bolted in place, the replaceable contact plate inserts 26 are installed. See Block 66. Once the replaceable contact plate inserts 26 are in place, the brake pads 16 are installed. See Block 68.

It will be understood that the embodiment of the present invention that is illustrated and described is merely exemplary and that a person skilled in the art can make many variations to that embodiment. For instance, the dimensions of the components can be varied for use with different sized trucks and different brands of brake pads. All such embodiments are intended to be included within the scope of the present invention as defined by the appended claims.

What is claimed is:

1. A brake assembly, comprising:
   brake pads that have metal back plates;
   a caliper for selectively moving said brake pads;
   contact plate inserts, wherein each of said contact plate inserts has a first plate and a second plate, wherein each said first plate has a front surface, a rear surface, a top edge and a bottom edge,
   wherein said second plate extends at a perpendicular from said front surface of said first plate at a first distance from said bottom edge,
   wherein a section of said first plate extends between said second plate and said bottom edge, and
   wherein a guide key extends at a perpendicular from said rear surface of said first plate;
   caliper mount brackets that receive and retain said contact plate inserts, wherein each of said caliper mount brackets has a support mount with a groove that receives said guide key and a recess that receives said section of said first plate;
   wherein said metal back plates of said brake pads are supported by said contact plate inserts within said caliper mount brackets of said brake assembly.

2. The assembly according to claim 1, wherein said contact plate inserts are separate and distinct from said caliper mount brackets and can be selectively removed from said caliper mount brackets and replaced.

3. The assembly according to claim 1, wherein said contact plate inserts are harder than said metal back plates.

4. The assembly according to claim 1, wherein said first plate has a midline that extends from said top edge to said bottom edge, wherein said midline bisects both said top edge and said bottom edge, wherein said guide key extends from said rear surface of said first plate along said midline.

5. A caliper mount assembly for use in attaching a brake pad to a caliper, said assembly comprising:
   contact plate inserts that each have a first plate and a second plate that extends from said first plate at a perpendicular, wherein each said first plate has a front surface, a rear surface, a top edge and a bottom edge, and wherein said second plate extends from said front surface of said first plate at a first distance from said bottom edge so that a section of said first plate extends between said second plate and said bottom edge,
   wherein a guide key extends at a perpendicular from said rear surface of said first plate; and
   a caliper mount bracket that attaches to said caliper, wherein said caliper mount bracket has a support mount with a groove that receives said guide key and a recess that receives said section of said first plate so that said caliper mount bracket receives and retains said contact plate inserts and each said first plate and each said second plate are positioned to support said brake pad when said brake pad is added to said caliper mount assembly.

6. The assembly according to claim 5, wherein said first plate has a midline that extends from said top edge to said bottom edge, wherein said midline bisects both said top edge and said bottom edge, and said guide key extends from said rear surface of said first plate along said midline.

7. A caliper mount assembly, comprising:
   a caliper mount bracket having a first machined surface into which a groove is formed and a second machined surface into which a recess is formed;
   a contact plate insert having a first plate and a second plate that extends from said first plate at a perpendicular, wherein said first plate has a front surface, a rear surface, a top edge and a bottom edge,
   wherein said first plate has a section that extends from said bottom edge to said second plate,
   wherein said section is received within said recess on said caliper mount bracket.

8. The assembly according to claim 7, wherein said caliper mount bracket has a guide key that extends from said rear surface of said first plate, wherein said guide key slides within said groove.

9. The assembly according to claim 8, wherein said first plate has a midline that extends from said top edge to said bottom edge, wherein said midline bisects both said top edge and said bottom edge, wherein said guide key extends from said rear surface of said first plate along said midline.

\* \* \* \* \*